Dec. 28, 1954  J. L. MARIANI PIAZZA  2,697,891
APPARATUS FOR THE PRODUCTION OF ENLARGED
PHOTOPRINTS AND PHOTOGRAVURES
Filed Dec. 11, 1950  3 Sheets-Sheet 1
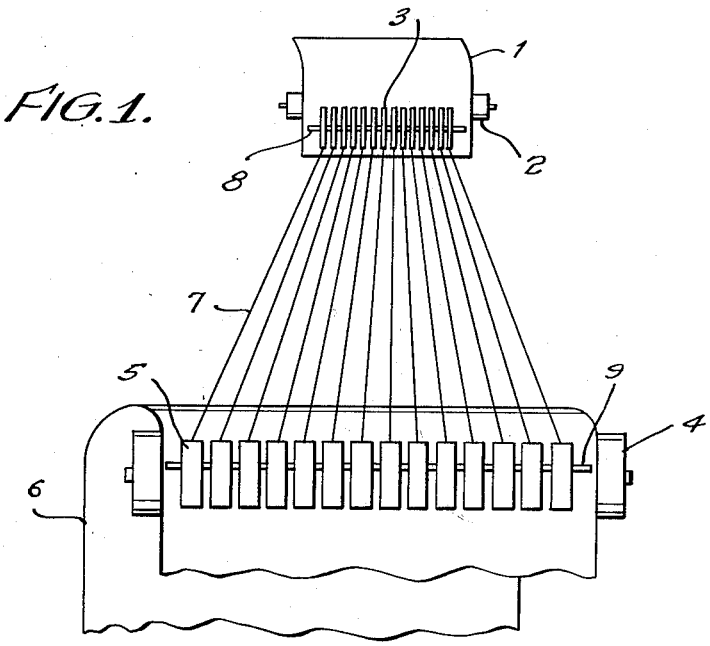
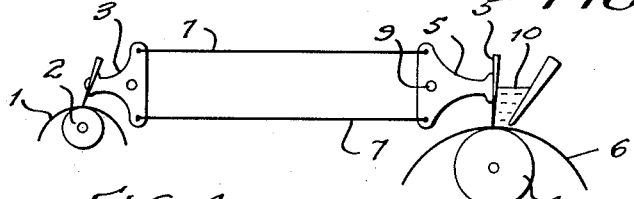
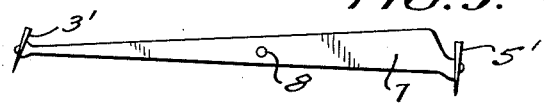
INVENTOR.
Jose Luis Mariani Piazza
BY

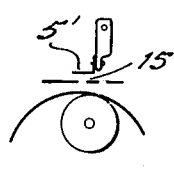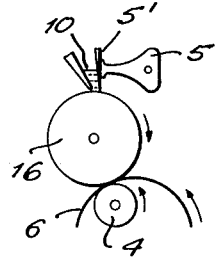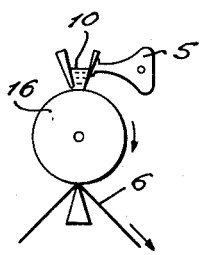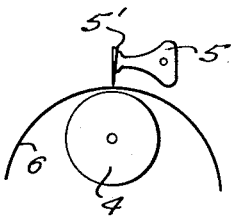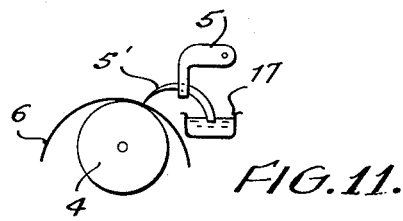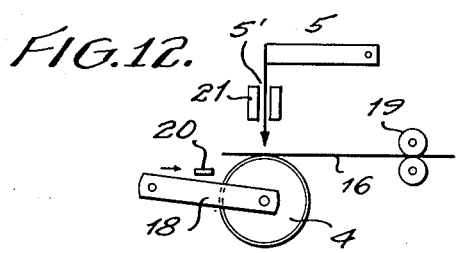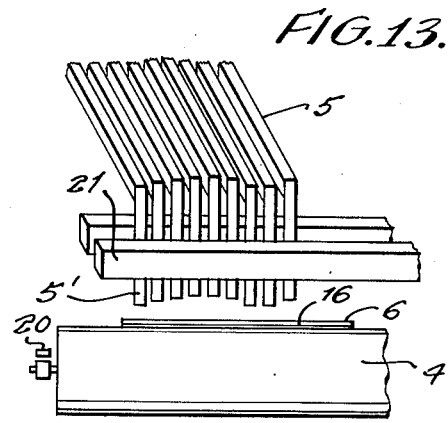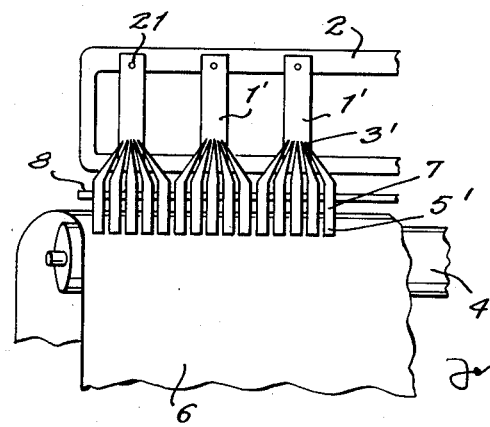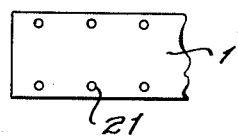

Dec. 28, 1954    J. L. MARIANI PIAZZA    2,697,891
APPARATUS FOR THE PRODUCTION OF ENLARGED
PHOTOPRINTS AND PHOTOGRAVURES

Filed Dec. 11, 1950            3 Sheets-Sheet 3

INVENTOR.
Jose Luis Mariani Piazza
BY

United States Patent Office 2,697,891
Patented Dec. 28, 1954

2,697,891

APPARATUS FOR THE PRODUCTION OF ENLARGED PHOTOPRINTS AND PHOTOGRAVURES

Jose L. Mariani Piazza, Sevilla, Spain

Application December 11, 1950, Serial No. 200,225

Claims priority, application Spain December 10, 1949

15 Claims. (Cl. 41—1)

The present invention relates to an apparatus for making enlarged prints, gravures and etchings.

It is the object of the present invention to provide an apparatus by which the enlargement is not made by light on a photosensitive surface, but by a mechanically operated reproducing device. This reproducing device prints the enlarged picture on a sheet by means of a special ink, or makes an etching or a photogravure on a metal sheet.

In order to enlarge a picture, a matrix in the form of a photographic relief or a carbon print on a metal sheet must be made first so that light and dark portions are reproduced on the matrix in a manner which can be picked up by the apparatus.

In the event that the matrix is a relief, the impulses picked up by a pickup device are transmitted to the reproducing device mechanically. In the event that the matrix is a carbon print on a metal sheet, the impulses picked up by the pickup device are transmitted electrically. The latter method is particularly suited for reproductions of drawings and etchings.

The pickup device of an enlarging apparatus according to the present invention consists of a plurality of members disposed in a row so that the points of the members form a line.

The matrix of the picture to be reproduced is placed on a rotating cylinder. The members of the pickup device touch the matrix along a line parallel to the axis of the cylinder, and when the cylinder is rotated, the pickup members come into contact with the matrix along parallel lines until by the movement of the cylinder normal to the line formed by the pickup members all portions of the picture are brought into contact with the pickup device along parallel lines. Each member of the pickup device receives separate impulses which are conveyed by separate conveying means to a row of members of a printing or reproducing device, whereby for each member of the pickup device a corresponding member of the conveying means and of the printing device is provided.

The members of the reproducing device are larger and spaced at greater intervals than the members of the pickup device so that an enlarged line is reproduced. The sheet on which the reproduction is to be made is placed on a cylinder which is rotated. The ratio between the speeds at which the matrix and the reproduction are moving is the same as the ratio between the length of the line covered by the pickup device and the length of the line covered by the reproducing device.

The number of the pickup members is equal to the number of reproducing members so that the width of each point of a reproducing member is greater than the width of the corresponding pick-up or scanning member in the ratio of enlargement. The supporting cylinders must be operatively connected in such manner as to assure that at any moment corresponding lines of the matrix and of the sheet on which the reproduction is made are under the corresponding pickup members and reproducing members, respectively. The rotation of the cylinders can be continuous or interrupted.

Every point of a line in a picture is separately picked up, and the received impulse is separately conveyed to a separate corresponding member in the reproducing device which prints or etches a corresponding point of the reproduction. As points of the picture forming a line are picked up simultaneously by the row of pickup members, a corresponding line is simultaneously reproduced by the reproducing device.

The impulses received by the pickup device are conveyed to the reproducing device either mechanically or electrically. If the device works on the mechanical principle, a matrix showing the picture as photo relief is made first in which light and dark portions are of different height. The pickup device consists of a row of small levers tiltably arranged on a shaft so that their points form a line. Each point is pressed independently to the relief by the weight of the lever, or by its resiliency, or by a separate spring attached to the lever. When the line of the points of the levers moves across the relief, the points move up and down the higher and lower elements of the relief. These motions tilt the levers which are connected either directly or by means of a wire or thread to corresponding levers of the reproducing device.

By the movement of the levers of the reproducing device a corresponding amount of a special ink is allowed to flow on the sheet on which the picture is reproduced.

In the event that electric means are used for conveying the impulses, a carbon print of the picture to be reproduced is made on a sheet of metal whereby light and dark portions of the picture are reproduced as carbon deposits.

Electric currents passing through the carbon print and each pickup member separately are conducted through the coils of electric magnets which act on the corresponding levers of the reproducing device. When a point of the pickup device touches a carbon deposit, the current is interrupted, and when a point touches the metal of the sheet, the current is closed. A current flowing through the magnet coil of a reproducing member causes the member to move. When greater force is required for the reproducing device, electric relays are used. According to the impulses received, the members of the reproducing device are pressed to the sheet, or lifted off and kept at a distance from the sheet. The actuation of the reproducing device by electric means is particularly suited for the reproduction of drawings.

An apparatus according to the present invention comprises one set or row of pickup members and two separate sets or rows of reproducing members. The pickup device is adapted to receive electrical and mechanical impulses, while one reproducing device is actuated by mechanical means and another by electric means. During the operation of one reproducing device the other one must be disconnected.

In the event that the apparatus is only to be used for reproduction of photo reliefs, the electric equipment becomes unnecessary and the construction can be simplified.

On the other hand, it is also possible to use only electric means to convey the impulses. A simplified apparatus of this kind is suitable for reproduction of drawings and etchings.

In this event, the pickup device consists of a row of insulated wires elastically resting on the carbon print of the drawing which is reproduced. Generally, only black and white can be reproduced since the pickup device can only close or interrupt an electric current.

However, if a picture is made of lines parallel to the line formed by the points of the pickup device, gray can be shown in the reproduction according to the density of the lines of the drawing since on dark portions of the picture the lines will come into contact with each other.

An apparatus according to the present invention can also be used for enlarged reproduction of three-color prints. In the latter event, the sheet on which the enlarged reproduction is made, is run three times through the printing and reproducing device while every time an ink of a different color is used. Each of these three prints is made from a different matrix corresponding to the color reproduced. In this process, the supporting cylinders must be provided with pins and the sheets with corresponding perforations, preferably reinforced, to avoid slipping and to assure exactly the same position of the sheets in all three steps of the process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic plan view of an embodiment of the present invention;

Fig. 2 is a schematic side view of the embodiment shown in Figure 1;

Fig. 3 is a schematic side view of an embodiment of a pickup member;

Fig. 4 is a schematic side view of another embodiment of a pickup member;

Fig. 5 is a schematic side view of a combined pickup and reproducing member;

Fig. 6 is a schematic side view of an embodiment of an electrically operated reproducing device;

Figure 16:
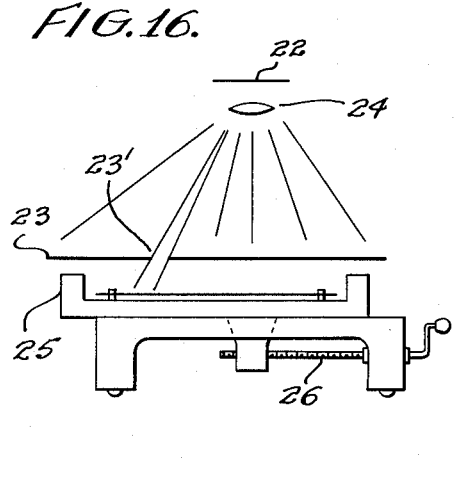
Figure 17:
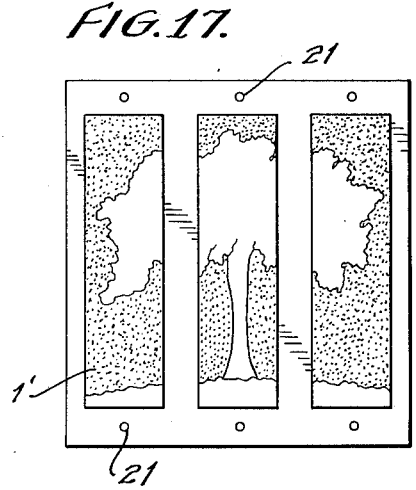
Figure 18:
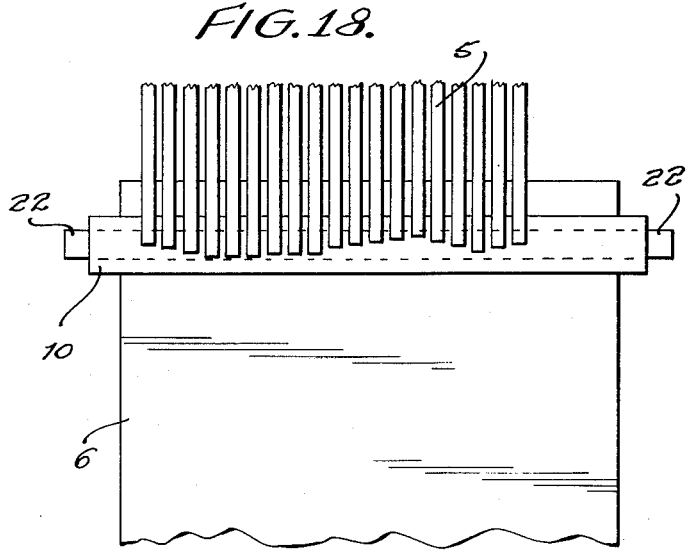
Figure 19:
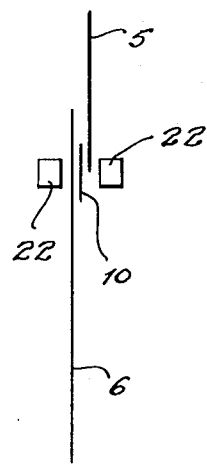

Figs. 7, 8, 9, 10, and 11 are schematic side views of various embodiments of reproducing devices;

Fig. 12 is a schematic side view of a modified embodiment of the invention;

Fig. 13 is a schematic front view of the embodiment shown in Fig. 12;

Fig. 14 is a plan view of a simplified embodiment of the invention;

Fig. 15 is a plan view of a matrix used in the embodiment of Fig. 14;

Fig. 16 is a schematic side view of a device for producing a matrix for use in the embodiment shown in Figure 14;

Fig. 17 is a plan view of the matrix as used in the embodiment shown in Figure 14;

Fig. 18 is a schematic front view of a modified embodiment of the invention;

Fig. 19 is a schematic side view of the embodiment shown in Figure 18; and

Figure 20:
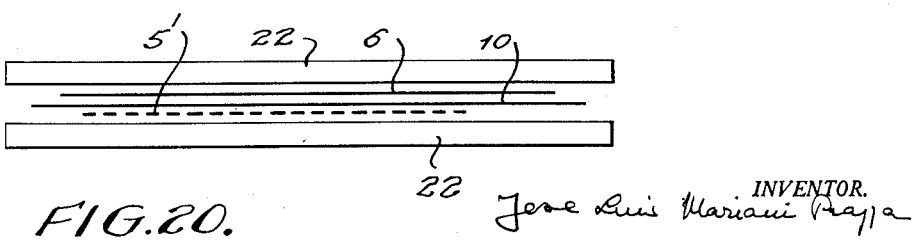

Fig. 20 is a schematic plan view of the embodiment shown in Figure 18.

In Figures 1 and 2 the matrix 1 is placed on the rotating cylinder 2 and moves across the row of pickup members 3 which are arranged tiltably about the axis 8. The movements of the pickup members 3 caused by the relief on the matrix are separately conveyed by means of threads 7 to the reproducing members 5 arranged tiltably about the axis 9. The special ink 10 controlled by the movement of the reproduction controlling points of the reproducing members 5, 5' flows onto the sheet 6 which is placed on the rotating cylinder 4.

In Figure 3 an embodiment of the pickup member is shown. The pickup member is a lever 3 provided with a pickup point 3'. The embodiment of a pickup member shown in Figure 4 consists of an elastic member 3 which presses the point 3' against the matrix. In this embodiment, the set of elastic pickup members is clamped between two supporting members 8.

A combined pickup and reproducing member is shown in Figure 5 in which a lever 7 connects the points 3' and 5' and is tiltably mounted on an axis 8.

In the event that the matrix is a carbon print on a metal sheet, electricity is employed to convey the impulses received by the pickup device to the reproducing device and to control the movements of the reproducing device.

As shown in Figure 6, a current from a battery 11 flows over contacts 12, the matrix 1, pickup device 3, wire 7 to a coil 13 and back to the battery 11. Coil 13 is disposed on a magnet 14 secured to the reproducing member 5 which is tiltable about axis 9. According to the carbon deposit on the metal matrix, the current flows or is interrupted. Magnet 14 actuates the reproducing member 5 corresponding to the electric impulse.

In order to obtain different kinds of reproductions, the reproducing device must be varied. In the embodiment shown in Figure 2, the movement of the members 5 of the reproducing device controls the flow of a special ink or dye 10. In the event that the reproduction is a photogravure, a special grease ink is used which reproduces the picture on a metal sheet. When the metal sheet is later exposed to an acid treatment, the acid works only on the portions not covered by the grease whereby a gravure is produced.

It is also possible to cover the sheet on which reproduction is made by a film of a suitable material and to operate the reproducing device in such manner that the film is scraped off according to the movements of the pickup device.

An embodiment of the reproducing device suitable for this process is shown in Figure 10. The reproducing member is a small knife 5' which cuts into a wax film previously deposited on a metal sheet 6. After the picture is reproduced, the metal sheet 6 is treated with an acid whereby a photogravure is obtained.

The pointed member 5' in Figure 2 is exchangeable so that special points can be used in case the dye or special ink is sprayed on as a powder or liquid. In a process of this type the reproducing member in Figure 7 is provided with a small plate 5' which by its movements covers a window 15 to a greater or lesser extent without touching it, whereby the amount of dye or ink sprayed on the sheet is controlled.

An indirect printing process is shown in Figure 8 according to which the ink 10 is deposited on the smooth metal cylinder 16 which allows a more precise reproduction than the surface of the paper. Under the action of a spring (not shown), a cylinder 4 presses the sheet 6 against the rotating cylinder 16 whereby the print is transferred from cylinder 16 to sheet 6.

It is also possible to move the sheet in a direction opposed to the motion of the printing cylinder 16. In Figure 9 an arrow shows the direction in which the sheet 6 is moving.

The print can also be made with a liquid ink. In the embodiment of the reproducing device shown in Figure 11, the point of the reproducing member 5 is a capillary tube 5' one end of which is immersed in a liquid ink 10 disposed in a receptacle 17.

In the event that the reproduction is to be etched, a modified embodiment of the invention is employed in order to operate the reproducing device with greater force, as shown in Figures 12 and 13.

A metal sheet 6 which is to be etched is placed on the plate 16 moved by two cylinders 19 and resting on cylinder 4 which is mounted on a tiltable supporting member 18. A stop 20 limits the upward movement of the cylinder 4. The reproducing etching needles 5 are clamped in a device 21 which can be released.

In this embodiment of the invention, the movements of the matrix and the movements of the metal plate on which the etching is made are not simultaneous and continuous but intermittent. A pawl engaging a gear or a rack bar turns the cylinders 19 from one line to the next. The pawl (not shown), supporting lever 18 and the clamps 21 are actuated by electric magnets (not shown).

The reproducing process in this embodiment takes place as follows:

(1) The device is in the position shown in Figure 13. No current is flowing.

(2) A distributor (not shown) sends an electric impulse to a pawl (not shown) which moves the cylinders 19 and the matrix for one line. The reproducing members take their corresponding positions according to the position of the pickup members.

(3) The distributor sends an electric impulse to the clamping device 21, which closes and secures the position of the reproducing members 5.

(4) The distributor sends an electric impulse to the magnet controlling the supporting lever 18 of cylinder 4 which is lifted and pressed against the points or dies 5' of the reproducing device 5.

(5) The distributor sends an impulse to the electric magnet which turns cylinder 19 and moves the plate 16 for one line whereby the rigidly clamped reproducing device 5 etches a line in the metal sheet which is pressed against the points 5' by the lifted cylinder 4.

If the points 5' of the reproducing member 5 have the width of a line, cylinder 4 is not turned while in contact with the reproducing device but is first lowered and then turned.

In a similar embodiment, an inked ribbon is pressed by the reproducing device against a sheet of paper. In that event, the points of the reproducing device are blunt.

In a modified embodiment shown in Figures 18, 19, and 20, the impulses sent out by the pickup members displace the reproducing members 5 parallel to the sheet 6. Between the reproducing device 5 and the sheet 6, an inked ribbon 10 is disposed. Between two jaws 22, the reproducing members 5', the inked ribbon 10, and the sheet 6 are pressed together whereby an imprint is made on sheet 6. According to the position of the reproducing members, imprints of a different size are made when the cylinder 4 is turned, and all imprints form an enlarged line.

A further simplified embodiment of the invention is adapted only for enlargements from a photo relief and has no electrically actuated reproducing device.

In an embodiment of that type shown in Figure 14, the pickup members can be combined with the corresponding reproducing member as shown in Figure 5.

In this embodiment, the pickup points 3' are arranged in groups as shown in Figure 14, while the reproduction controlling points of the reproducing members 5' form one continuous line. The operation is substantially the same as described for the embodiment of Fig. 5. It is, however, necessary to divide the relief matrix 1 into strips 1'. The strips 1' are secured to a frame 2 by means of perforations 21 fitting on pins in the frame 2. The frame 2 is moved in the reproducing process so that all of the surface of the strips 1' is brought into contact with the pickup device 3'. The sheet 6 for the reproduction is placed on the cylinder 4.

In this process, a special matrix is required. First, a diapositive print is made from which a negative print is made on a film. Two perforations 21 are made in that film for each of the strips into which the film is to be cut. The film is exposed in an enlarging device in a frame shown in Figure 16. A cover 23 allows only the portion of the film under window 23' to be exposed by the light passing through the diapositive 22 and the lens 24. In the example shown, three portions of the film are exposed by moving the window 23' into three different positions and making an exposure in each position. Frame 25 is displaced by manual means 26 simultaneously and in the opposite direction to the movement of the window whereby a border separating the exposed portions is produced.

In Figure 17 negative film strips are shown. In order to simplify the drawing, only three strips of the film are shown, while as a rule the device operates with a greater number of strips.

On every strip, the border portion of the portion of the picture on the adjacent strip is shown so that the reproductions overlap. A print of the exposed, developed and dried negative film is then made on a special film which shows a relief after development. This special film is then cut into a number of strips 1', for instance three strips as shown in Figs. 14 and 17, and then placed under the pickup device 3 of the apparatus.

In a further embodiment, only electric impulses of the pickup device are conveyed to the reproducing device as shown in Figure 6. In that event, the pickup device consists of a plurality of insulated elastic wires forming a comb and no mechanically operated reproducing device is provided.

It will be understood that each of the elements described above, or two or more together, may also find a useful application in other types of reproducing apparatuses, differing from the types described above.

While I have illustrated and described the invention as embodied in an apparatus for the production of enlarged photoprints and photogravures, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. An enlarging apparatus, comprising, in combination, first movable supporting means for a matrix bearing a relief picture; second movable supporting means for supporting a sheet material on which a reproduction of said relief picture is to be made, said second movable supporting means moving at a speed depending on the speed of said first movable supporting means in a ratio predetermined by the extent of the desired enlargement; drive means driving said first and second movable supporting means; a plurality of scanning members pivotable about a common pivoting axis extending normal to the direction of movement of said first movable supporting means, said scanning members having scanning points arranged in a line parallel to said pivoting axis, each of said scanning members adapted to engage said relief picture and to be moved to an extent depending on the height of the element of said relief picture over which said scanning point passes during movement of said first movable supporting means; a plurality of reproducing members pivotable about a common pivoting axis extending normal to the direction of movement of said second movable supporting means and having reproduction controlling points arranged in a line parallel to said line of said scanning points, each of said reproduction controlling points having in axial direction a width being larger than the width of said scanning points in said ratio of enlargement, each of said reproducing members corresponding to one of said scanning members; connecting means connecting each scanning member with a corresponding reproducing member so that displacement of any one scanning member effects displacement of the corresponding reproducing member; and marking means extending parallel to said pivoting axis of said reproducing members above said second movable supporting means so as to be adapted to mark a sheet material supported on the same, said marking means being controlled by said reproduction controlling points to mark said sheet material to a degree corresponding to the displacement of said reproducing members for a width corresponding to the ratio of enlargement.

2. An enlarging apparatus, comprising, in combination, first movable supporting means for a matrix bearing a relief picture; second movable supporting means for supporting a sheet material on which a reproduction of said relief picture is to be made, said second movable supporting means moving at a speed depending on the speed of said first movable supporting means in a ratio predetermined by the extent of the desired enlargement and in the same direction as said first movable supporting means; drive means driving said first and second movable supporting means; a shaft extending normal to said direction of movement of said first and second movable supporting means; a plurality of scanning members having scanning points arranged in a line parallel to said pivoting axis, each of said scanning members adapted to engage said relief picture and to be moved to an extent depending on the height of the element of said relief picture over which said scanning point passes during movement of said first movable supporting means; a plurality of reproducing members having reproduction controlling points arranged in a line parallel to said line of said scanning points, each of said reproduction controlling points having an axial direction a width being larger than the width of said scanning points in said ratio of enlargement, each of said reproducing members coresponding to one of said scanning members; a plurality of two-armed levers pivotally mounted on said shaft, each two-armed lever connecting one scanning member with a corresponding reproducing member so that displacement of any one scanning member effects displacement of the corresponding reproducing member; and marking means extending parallel to said pivoting axis of said reproducing members above said second movable supporting means so as to be adapted to mark a sheet material supported on the same, said marking means being controlled by said reproduction controlling points to mark said sheet material to a degree corresponding to the displacement of said reproducing members for a width corresponding to the ratio of enlargement.

3. An enlarging apparatus, comprising, in combination, first movable supporting means for a matrix bearing a relief picture; second movable supporting means for supporting a sheet material on which a reproduction of said relief picture is to be made, said second movable supporting means moving at a speed depending on the speed of said first movable supporting means in a ratio predetermined by the extent of the desired enlargement; drive means driving said first and second movable supporting means; a plurality of scanning members pivotable about a common pivoting axis extending normal to the direction of movement of said first movable supporting means, said scanning members having scanning points arranged in a line parallel to said pivoting axis, each of said scanning members adapted to engage said relief picture and to be moved to an extent depending on the height of the element of said relief picture over which said scanning point passes during movement of said first movable supporting means; a plurality of reproducing members pivotable about a common pivoting axis extending normal to the direction of movement of said second movable supporting means, each of said reproducing members corresponding to one of said scanning members; connecting means connecting each scanning member with a corresponding reproducing member so that displacement of any one scanning member effects displacement of the corresponding reproducing member; and a marking means adapted to hold ink arranged opposite said reproducing members and defining with the same an elongated outlet extending above said second movable supporting means normal to the direction of movement thereof, each reproducing member controlling a portion of said outlet so that a displacement of any one of said reproducing members permits an amount of ink corresponding to the degree of displacement of said reproducing member to flow through the corresponding portion of said outlet onto said sheet.

4. An enlarging apparatus, comprising, in combination, first movable supporting means for a matrix bearing a relief picture; second movable supporting means for supporting a sheet material on which a reproduction of said relief picture is to be made, said second movable supporting means moving at a speed depending on the speed of said first movable supporting means in a ratio predetermined by the extent of the desired enlargement and in the same direction as said first movable supporting means; drive means driving said first and second movable supporting means; a shaft extending normal to said direction of movement of said first and second movable supporting means; a plurality of scanning members having scanning points arranged in a line parallel to said pivoting axis, each of said scanning members adapted to engage said relief picture and to be moved to an extent depending on the height of the element of said relief picture over which said scanning point passes during movement of said first movable supporting means; a plurality of reproducing members, each of said reproducing members corresponding to one of said scanning members and having a width being larger than the width of said scanning points in the ratio of enlargement; a plurality of two-armed levers pivotally mounted on said shaft, each two-armed lever connecting one scanning member with a corresponding reproducing member so that displacement of any one scanning member effects displacement of the corresponding reproducing member; and a marking means adapted to hold ink arranged opposite said reproducing members and defining with the same an elongated outlet extending above said second movable supporting means normal to the direction of movement thereof, each reproducing member controlling a portion of said outlet so that displacement of any one of said reproducing members permits an amount of ink corresponding to the degree of displacement of said reproducing member to flow through the corresponding portion of said outlet onto said sheet.

5. An enlarging apparatus, comprising, in combination, first movable supporting means for a matrix bearing a relief picture; second movable supporting means for supporting a sheet material on which a reproduction of said relief picture is to be made, said second movable supporting means moving at a speed depending on the speed of said first movable supporting means in a ratio predetermined by the extent of the desired enlargement and in the same direction as said first movable supporting means; drive means driving said first and second movable supporting means; a shaft extending normal to said direction of movement of said first and second movable supporting means; a plurality of scanning members having scanning points arranged in a line parallel to said pivoting axis, each of said scanning members adapted to engage said relief picture and to be moved to an extent depending on the height of the element of said relief picture over which said scanning point passes during movement of said first movable supporting means; a plurality of reproducing members having reproduction controlling points arranged in a line parallel to said line of said scanning points, each of said reproduction controlling points having in axial direction a width being larger than the width of said scanning points in said ratio of enlargement, each of said reproducing members corresponding to one of said scanning members; a plurality of two-armed levers pivotally mounted on said shaft, each two-armed lever connecting one scanning member with a corresponding reproducing member so that displacement of any one scanning member effects displacement of the corresponding reproducing member; and a marking means formed with an elongated opening extending above said second movable supporting means normal to said direction of movement thereof, each of said reproduction controlling points extending over a portion of said opening so that ink sprayed on said marking means is only permitted to pass onto said sheet through portions of said opening uncovered by the reproduction controlling points of displaced reproducing members.

6. An enlarging apparatus, comprising, in combination, first movable supporting means for a matrix bearing a relief picture; a rotating cylinder moving at a speed depending on the speed of said first movable supporting means in a ratio predetermined by the extent of the desired enlargement; drive means driving said first movable supporting means and said cylinder; a plurality of scanning members pivotable about a common pivoting axis extending normal to the direction of movement of said first movable supporting means, said scanning members having scanning points arranged in a line parallel to said pivoting axis, each of said scanning members adapted to engage said relief picture and to be moved to an extent depending on the height of the element of said relief picture over which said scanning point passes during movement of said first movable supporting means; a plurality of reproducing members pivotable about a common pivoting axis extending normal to the direction of movement of said rotating cylinder, each of said reproducing members corresponding to one of said scanning members; connecting means connecting each scanning member with a corresponding reproducing member so that displacement of any one scanning member effects displacement of the corresponding reproducing member; a marking means adapted to hold ink arranged opposite said reproducing members and defining with the same an elongated outlet extending above said rotating cylinder normal to the direction of movement thereof, each reproducing member controlling a portion of said outlet so that displacement of any one of said reproducing members permits an amount of ink corresponding to the degree of displacement of said reproducing member to flow onto said cylinder through the corresponding portion of said outlet; and second movable supporting means cooperating with said rotating cylinder so that a sheet arranged between said rotating cylinder and said movable supporting means receives an imprint of the ink deposited on said rotating cylinder.

7. An enlarging apparatus, comprising, in combination, first movable supporting means for a matrix bearing a relief picture; second movable supporting means for supporting a sheet material on which a reproduction of said relief picture is to be made, said second movable supporting means moving at a speed depending on the speed of said first movable supporting means in a ratio predetermined by the extent of the desired enlargement; drive means driving said first and second movable supporting means; a plurality of scanning members pivotable about a common pivoting axis extending normal to the direction of movement of said first movable supporting means, said scanning members having scanning points arranged in a line parallel to said pivoting axis; each of said scanning members adapted to engage said relief portion and to be moved to an extent depending on the height of the element of said relief picture over which said scanning point passes during movement of said first movable supporting means; a plurality of reproducing members pivotable about a common pivoting axis extending normal to the direction of movement of said second movable supporting means, each of said reproducing members corresponding to one of said scanning members; connecting means connecting each scanning member with a corresponding reproducing member so that displacement of any one scanning member effects displacement of the corresponding reproducing member; a plurality of marking members, each marking member secured to one of said reproducing members, said marking members being arranged above said second movable supporting means and adapted to mark a sheet supported on the same, said marking members having reproduction controlling points arranged in a line parallel to said line of said scanning points, each of said reproduction controlling points having in axial direction a width being larger than the width of said scanning points in said ratio of enlargement; clamping means extending on both sides of said marking members and being movable between a clamping position holding said marking members and a releasing position, first actuating means moving said clamping means to said clamping position when said reproducing members are displaced in accordance with the displacement of said scanning points engaging a relief picture; means supporting said second movable supporting means for pivotal movement; second actuating means pivoting said second movable supporting means and pressing the same against said marking members so that a sheet supported on said second supporting means is marked; and operating means operating first said first actuating means to move said clamping means to clamping position, and then said second actuating means to press said second movable supporting means against said marking members.

8. An enlarging apparatus according to claim 7 wherein said reproduction controlling points are etching points, and including stop means limiting movement of said second actuating means.

9. An enlarging apparatus according to claim 7 wherein said reproduction controlling points are blunt; and including an inked ribbon arranged between said blunt points and said second movable supporting means.

10. An enlarging apparatus, comprising, in combination, first movable supporting means for supporting a plurality of spaced strip-shaped matrices, each strip-shaped matrix bearing a portion of a relief picture; second movable supporting means for supporting a sheet material on which a reproduction of said relief picture is to be made, said second movable supporting means moving at a speed depending on the speed of said first movable supporting means in a ratio predetermined by the extent of the desired enlargement and in the same direction as said first movable supporting means; drive means driving said first and second movable supporting means; a shaft extending normal to said direction of movement of said first and second movable supporting means; a plurality of scanning members having scanning points arranged in a line parallel to said pivoting axis and in a plurality of spaced groups, each group adapted to be arranged over one of said strip-shaped matrices, each of said scanning members adapted to engage said relief picture and to be moved to an extent depending on the height of the element of said relief picture over which said scanning point passes during movement of said first movable supporting means; a plurality of reproducing members, each of said reproducing members corresponding to one of said scanning members and having a width being larger than the width of said scanning points in the ratio of enlargement; a plurality of two-armed levers pivotally mounted on said shaft, each two-armed lever connecting one scanning member with a corresponding reproducing member so that displacement of any one scanning member effects displacement of the corresponding reproducing member; and a marking means adapted to hold ink arranged opposite said reproducing members and defining with the same an elongated outlet extending above said second movable supporting means normal to the direction of movement thereof, each reproducing member controlling a portion of said outlet so that displacement of any one of said reproducing members permits an amount of ink corresponding to the degree of displacement of said reproducing member to flow through the corresponding portion of said outlet onto said sheet.

11. An enlarging apparatus as claimed in claim 1 wherein said marking means include a bar having a lower edge located opposite said reproduction controlling points of said reproducing member and defining with the same an outlet for the application of a marking substance.

12. An enlarging apparatus as claimed in claim 2 and including a cover plate located between said marking means and said second movable supporting means, and formed with an elongated opening located under said reproduction controlling points, portions of said opening being closed by the points of displaced reproducing member for preventing passing of sprayed coloring material.

13. An enlarging apparatus as claimed in claim 10, wherein said reproducing members are arranged in a continuous line parallel to said points of said scanning members.

14. An enlarging apparatus as claimed in claim 6, wherein said second movable supporting means is a roller means rotating in opposite direction with respect to said rotating cylinder.

15. An enlarging apparatus as claimed in claim 6, wherein said second movable supporting means are movable toward and away from a surface portion of said rotating cylinder, for pressing a sheet moving in a direction opposite to the direction of movement of said surface portion against the same so as to form a smudged imprint.

References Cited in the file of this patent

UNITED STATES PATENTS

| Number | Name | Date |
|--------|------|------|
| 501,091 | Morgeneier | July 11, 1893 |
| 915,154 | Belin | Mar. 16, 1909 |
| 2,143,875 | Hansell | Jan. 17, 1939 |
| 2,472,273 | Bates | June 7, 1949 |